United States Patent
Emond

(10) Patent No.: US 8,146,946 B1
(45) Date of Patent: Apr. 3, 2012

(54) RESTRAINT ADJUSTMENT APPARATUS, METHOD AND SYSTEM

(76) Inventor: Elizabeth A Emond, Alexandria, VA (US)

( * ) Notice: Subject to any disclaimer, the term of this patent is extended or adjusted under 35 U.S.C. 154(b) by 0 days.

(21) Appl. No.: 13/027,835

(22) Filed: Feb. 15, 2011

(51) Int. Cl.
 *B60R 22/30* (2006.01)
(52) U.S. Cl. .............. 280/801.1; 280/808; 297/483
(58) Field of Classification Search .......... 280/801.1, 280/808; 297/482, 483, 485, DIG. 6; 24/187, 24/170, 198, 163 FC, 306, 442
See application file for complete search history.

(56) References Cited

U.S. PATENT DOCUMENTS

| | | |
|---|---|---|
| 2,546,689 A | 3/1951 | Frieder et al. |
| 2,832,120 A | 4/1958 | Jayet et al. |
| 3,291,528 A | 12/1966 | Sencabaugh |
| 3,564,672 A | 2/1971 | McIntyre |
| 3,605,207 A | 9/1971 | Glauser et al. |
| 3,639,948 A | 2/1972 | Sherman |
| 3,673,645 A | 7/1972 | Burleigh |
| 4,289,352 A | 9/1981 | Ashworth |
| 4,648,625 A | 3/1987 | Lynch |
| 4,832,367 A | 5/1989 | Lisenby |
| 4,886,318 A | 12/1989 | Pennock |
| 4,921,013 A | 5/1990 | Weightman et al. |
| 4,929,027 A | 5/1990 | Beauvias, II |
| 4,938,535 A | 7/1990 | Condon et al. |
| 4,946,198 A | 8/1990 | Pittore et al. |
| 4,951,965 A | 8/1990 | Brown |
| 4,973,083 A | 11/1990 | Richards et al. |
| 5,005,865 A | 4/1991 | Kruse |
| 5,042,838 A | 8/1991 | Carter |
| 5,135,257 A | 8/1992 | Short |
| 5,201,099 A | 4/1993 | Campbell |
| 5,215,333 A | 6/1993 | Knight |
| 5,275,468 A | 1/1994 | Vacanti |
| 5,306,045 A | 4/1994 | Parks |
| 5,421,614 A * | 6/1995 | Zheng ............ 280/801.1 |
| 5,476,288 A | 12/1995 | Simodi, Jr. |
| 5,495,646 A | 3/1996 | Schrutchfield |
| 5,566,871 A | 10/1996 | Weintraub |
| 5,567,013 A | 10/1996 | Chang |
| 5,570,933 A | 11/1996 | Rouhana et al. |
| 5,575,044 A | 11/1996 | Zornes |
| 5,605,380 A | 2/1997 | Gerstenberger et al. |
| 5,609,367 A | 3/1997 | Eusebi et al. |
| 5,653,003 A | 8/1997 | Freeman |
| 5,669,118 A | 9/1997 | Franco et al. |
| 5,692,806 A | 12/1997 | Jones |
| 5,788,282 A | 8/1998 | Lewis |
| 5,795,030 A | 8/1998 | Becker |
| 5,911,479 A * | 6/1999 | Atkinson ............ 297/482 |
| 5,931,503 A | 8/1999 | Glendon |
| 6,050,647 A | 4/2000 | White |
| 6,092,265 A | 7/2000 | Sesay |
| 6,116,649 A | 9/2000 | Compton |
| 6,145,169 A | 11/2000 | Terzuola et al. |
| 6,174,032 B1 | 1/2001 | Conaway |

(Continued)

*Primary Examiner* — Joseph Rocca

(57) ABSTRACT

A method, system and apparatus for adjusting a restraining device. The method, system and apparatus can include a body foldably formed with a first segment, a second segment and a third segment. There may further be a first anchor and a second anchor disposed on an interior portion of the first segment, as well as a third anchor disposed on an interior portion of the second segment. Additionally, a backing material may be disposed on an interior portion of the third segment, on exterior portions of the first segment, the second segment and the third segment and extending beyond the exterior portion of the third segment and a coupling mechanism can be disposed on portions of the backing material.

9 Claims, 2 Drawing Sheets

U.S. PATENT DOCUMENTS

| | | |
|---|---|---|
| 6,203,110 B1 | 3/2001 | Proteau et al. |
| 6,216,323 B1 | 4/2001 | Oyamada |
| 6,247,208 B1 | 6/2001 | Creech |
| 6,293,589 B1 | 9/2001 | MacDonald et al. |
| 6,449,815 B1 | 9/2002 | Spiller |
| 6,484,369 B1 | 11/2002 | Conaway |
| 6,510,592 B1 | 1/2003 | Hamilton |
| 6,592,149 B2 | 7/2003 | Sessoms |
| 6,672,663 B2 | 1/2004 | Kain |
| 6,688,701 B1 | 2/2004 | Weaver |
| 6,725,509 B1 | 4/2004 | Lee et al. |
| 6,752,466 B2 | 6/2004 | Liang |
| 6,782,587 B2 | 8/2004 | Reilly |
| 6,869,105 B2 | 3/2005 | Cheng |
| 6,886,889 B2 | 5/2005 | Vits et al. |
| 6,922,154 B2 | 7/2005 | Kraljic et al. |
| 6,955,403 B1 | 10/2005 | Weaver |
| 6,962,394 B2 | 11/2005 | Anthony et al. |
| 6,969,122 B2 | 11/2005 | Sachs et al. |
| 7,059,636 B2 | 6/2006 | Berger |
| 7,144,086 B1 | 12/2006 | Harcourt et al. |
| 7,347,494 B2 | 3/2008 | Boyle et al. |
| 2002/0158457 A1* | 10/2002 | Simmons ................... 280/801.1 |

* cited by examiner

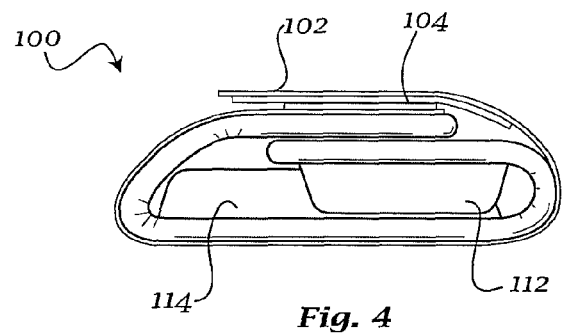
Fig. 4
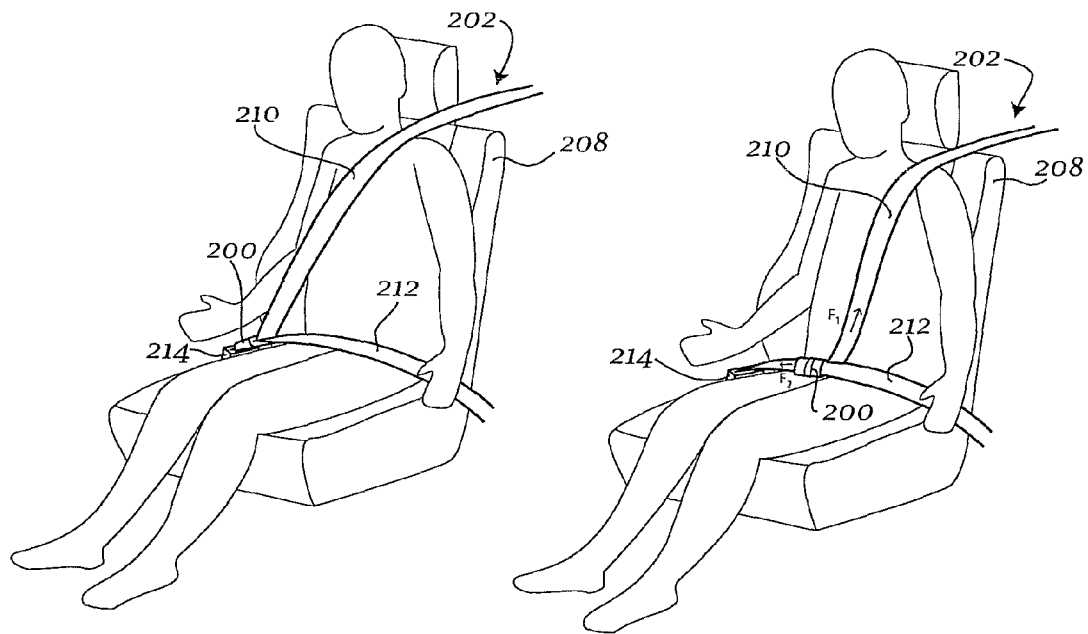
Fig. 5a     Fig. 5b

RESTRAINT ADJUSTMENT APPARATUS, METHOD AND SYSTEM

BACKGROUND

The use of seatbelts in vehicles is well known and, in many jurisdictions, mandated. Seatbelts have been shown to limit the amount of injuries that occur in the event of accidents, such as car accidents. Additionally, the implementation of seatbelts has evolved such that they now involve various styles and adjustments.

Currently, new automobiles are required to use a seatbelt that has both a lap belt and a shoulder belt. The shoulder belt, however, is known to cause discomfort to people of varying size. For example, irritation can occur when the shoulder belt rubs against the neck of a wearer. Additional discomfort can occur on the collarbone, chest and stomach area of a wearer and often results in the improper use of a seatbelt or the lack of the use of a seatbelt altogether. As a result, some automobiles now utilize seatbelt height adjustments as well as various tightness adjustments. These adjustments, however, do not resolve discomfort the wearer. Thus, aftermarket parts companies have made a number of items, such as pads that fit over seatbelts and other manners of adjustment to alleviate some of the discomfort. These aftermarket remedies, however, are often not successful or negatively affect the desired usefulness of the seatbelt.

SUMMARY

According to one exemplary embodiment, an apparatus for adjusting a restraint may be described. The apparatus can include a body foldably formed with a first segment, a second segment and a third segment; a first anchor and a second anchor disposed on an interior portion of the first segment; a third anchor disposed on an interior portion of the second segment; a backing material disposed on an interior portion of the third segment, on exterior portions of the first segment, the second segment and the third segment and extending beyond the exterior portion of the third segment; and a coupling mechanism disposed on portions of the backing material.

In another exemplary embodiment, a system for adjusting a seatbelt may be described. The system can have a foldable adjustment device and a seatbelt having a shoulder portion, a lap portion, a latch and a buckle, wherein after the latch of the seatbelt can be buckled into the buckle, the foldable adjustment device can be removably coupled around the shoulder portion of the seatbelt and the lap portion of the seatbelt in a position proximate the latch and the buckle and the foldable adjustment device can be moved along the lap portion of the seatbelt to adjust the location of the shoulder portion of the seatbelt.

A further exemplary embodiment can describe a method for adjusting a seatbelt. Steps for this method can include buckling a seatbelt having a lap portion and a shoulder portion; folding an adjustment device over the lap portion and the should portion of the seatbelt proximate to a buckle; securing the adjustment device to the lap portion and the shoulder portion of the seatbelt; coupling a first segment of the adjustment device to a second segment of the adjustment device; sliding the adjustment device along the seatbelt on a lap of a wearer of the seatbelt; and adjusting the position of the should portion of the seatbelt on the wearer of the seatbelt through the sliding of the adjustment device.

BRIEF DESCRIPTION OF THE FIGURES

Advantages of embodiments of the present invention will be apparent from the following detailed description of the exemplary embodiments. The following detailed description should be considered in conjunction with the accompanying figures in which:

FIG. 4 is an exemplary view of a restraint adjustment device in a closed position.

FIG. 5 is an exemplary view of a restraint adjustment device coupled to a seatbelt.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Generally referring to FIGS. 1-5, an apparatus, method and system for adjusting a restraint or restraining device may be shown. Exemplary embodiments may be directed towards the adjustment of a seatbelt, although it should be appreciated that the embodiments described herein may be applied to other articles as desired. Additionally, the embodiments described herein may be formed in any of a variety of manners and utilize any of a variety of components. Further, the apparatus, method and system may be such that the effectiveness of a restraining device is maintained while the comfort of the wearer of the restraining device is increased.

Figure 1:
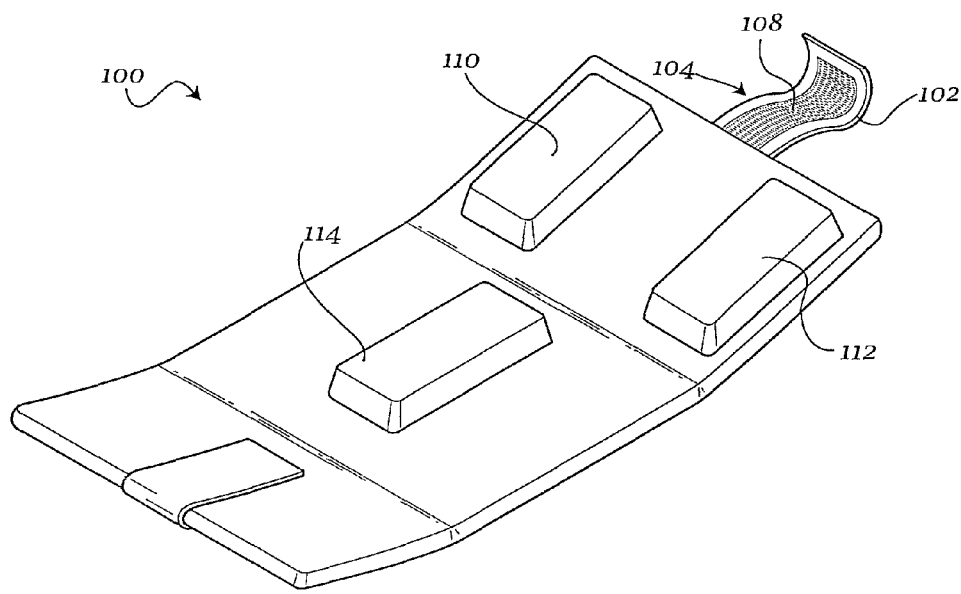
FIG. 1 is an exemplary perspective view of a restraint adjustment device in an open position.
Figure 2:
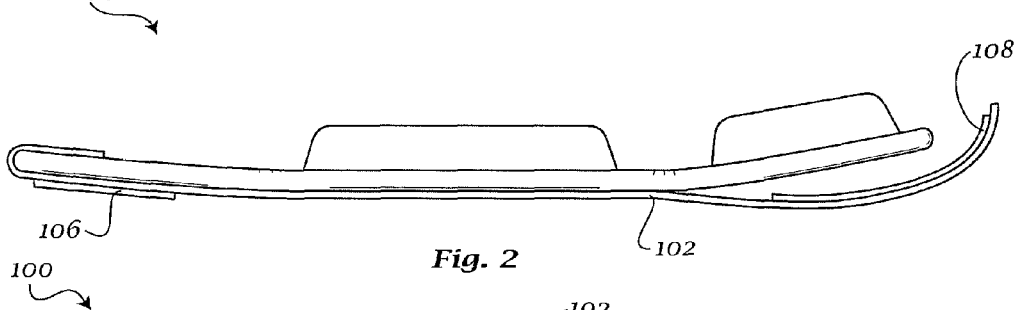
FIG. 2 is an exemplary side view of a restraint adjustment device in an open position.
Figure 3:
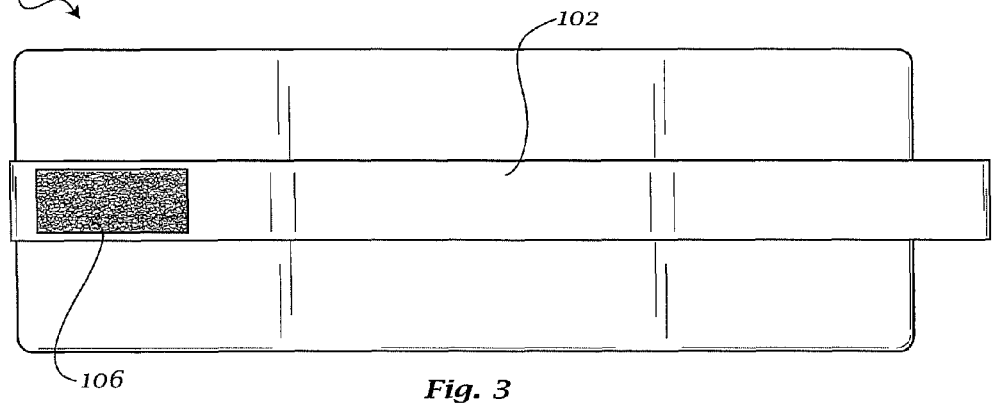
FIG. 3 is an exemplary bottom view of a restraint adjustment device in an open position.

Exemplary FIGS. 1-3 show a device that can be used to adjust the position of a restraint, such as a seatbelt. The adjuster 100 can be formed out of any material or combination of materials, for example a fabric, synthetic fabric or any resilient compound. One such material may be an acid-free foam material that covers a web designed polyurethane. In such exemplary embodiments, the foam material may be soft to the touch and comfortable to use, while the polyurethane may add strength and durability. Further any of the materials used for adjuster 100 may be such that they are not significantly affected by hot or cold temperatures and may further be substantially unaffected by the presence of moisture. Adjuster 100 may be formed such that it can house a number of different items, for example a desired number of anchors. For example, the material of adjuster 100 may be coupled by sewing halves of it together. Additionally, adjuster 100 can be formed such that it may be folded over and have one end coupled to another end, for example in a tri-fold configuration and may allow for three segments of the adjuster 100. Also, when in an open, or unfolded, position, adjuster 100 may have any desired dimensions according to particular implementations. For example, if adjuster 100 is to be utilized with a standard seat belt, adjuster 100 may be about 8" by about 1.75".

Still referring to exemplary FIGS. 1-3, a backing material may be disposed on an outside portion of adjuster 100. Backing 102 may include a coupling mechanism 104, such as a hook and loop coupling, Velcro®, a clasp or any other form of coupling device. Backing 102 may further be coupled to adjuster 100 in any desired fashion, for example through sewing or with an adhesive or in any other desired manner. Additionally, backing 102 may be such that it is substantially coupled to a portion of adjuster 100, but may also have an area that is not coupled to adjuster 100. The area of backing 102 that is not coupled to adjuster 100 may extend beyond a first segment of adjust 100 and can facilitate the coupling of one portion of adjuster 100 to another portion of adjuster 100, for example to put adjuster 100 in a closed position. The closed position may further be shown as a tri-fold closed position. For example, on a portion of backing that is coupled to adjuster 100, a looped fabric 106 may be disposed thereon. Further, on a portion of backing 102 which is not coupled to adjuster 100, a hooked fabric 108 may be disposed on an underside thereof. Thus, for example, when the adjuster 100 is folded over on itself, the hooked fabric 108 may coupled with the looped fabric 106 to seal the adjuster 100.

Still referring to exemplary FIGS. 1-3, a number of anchors may be disposed on adjuster 100. For example, first anchor 110, second anchor 112 and third anchor 114 may be formed under the fabric of adjuster 100. Anchors 110, 112 and 114 may be formed out of any desired material, for example foam, plastic, metal or any other rigid or semi-rigid compound or material and may be formed in any length or width, as desired. For example, anchors 110 and 112 may be about 0.5" by about 1" and anchor 114 may be about 0.5" by about 2". Anchors 110, 112 and 114 may further be formed and disposed on adjuster 100 so that they are substantially fixed in position. Additionally, anchors 110, 112 and 114 may be such that when adjuster 100 is in a closed position, the anchors may lock with one another. For example, when the adjuster 100 is in a closed position, anchor 114 may be disposed between anchors 110 and 112 and may be locked into position. In a further exemplary embodiment, when the adjuster 100 is in a closed position, anchors 110, 112 and 114 may couple in such a manner as to releasably seal another object, for example a seatbelt there between.

Exemplary FIG. 4 shows adjuster 100 in a closed position. Here, adjuster 100 utilizes a tri-fold design and coupling mechanism 104 to hold adjuster 100 such that anchor 114 is positioned substantially between anchors 110 and 112. Before adjuster 100 is folded into such a configuration, a restraining device, such as a seatbelt, could be passed through a central portion of adjuster 100. Then, when adjuster 100 is folded into the closed position, the restraining device could be held in place through the positioning of anchors 110 and 112 with respect to anchor 114. Such a configuration would allow for adjuster 100 to slide along the path of a restraining device while also maintaining its closed position.

Additionally, and still referring to exemplary FIG. 4, when a restraining device, such as the lap belt and shoulder belt of a standard seatbelt, is held inside the closed adjuster 100, there may be a free range of motion to move adjuster 100 along a path made by the combined lap belt and shoulder belt of the seatbelt. For example, if adjuster 100 is closed over a lap belt and a shoulder belt proximate the buckle of a seatbelt, the lap belt and shoulder belt may be substantially parallel, allowing a user to move adjuster 100 freely to a desired location. Further, at this time, a user may make any desired adjustments to the lap belt so ensure that the lap belt is in a comfortable or desired position or location. Additionally, a user of adjuster 100 may pull the shoulder belt to provide more slack and allow for adjust to move along a path of the lap belt and shoulder belt for a greater distance, until a desired location for adjuster 100 and the shoulder belt is reached. At such a location, any slack on the shoulder belt may be released and adjuster 100 may be locked in place or otherwise fixed into the position. For example, while the lap belt and shoulder belt may be secured using anchors 110, 112 and 114, the opposing forces of the lap belt, which may have a downwards force or force pulling towards a seatbelt buckle, and the shoulder belt, which may have a lateral or upwards force, can act to maintain the position of adjuster 100 and maintain a desired position of the shoulder belt. This may be shown further in exemplary FIG. 5.

In a further exemplary embodiment, and as shown in FIGS. 5a and 5b, a method and system for the use of a seatbelt adjuster with a seatbelt in an automobile may be shown. In this exemplary embodiment, adjuster 200 may be coupled with a seatbelt 202 in an automobile (not pictured). In this exemplary embodiment, a person may sit in car seat 208. Seatbelt 202 may then be fastened, as is known in the art, using a latch and a buckle (not pictured). Adjuster 200 may then be coupled to seatbelt 202, substantially in the manner described above. For example, adjuster 200 may be placed over seatbelt 202. Adjuster 200 may then be folded on top of itself, for example such that it is in a closed position. In such a position, anchors 110 and 112 may combine with anchor 114 around shoulder portion 210 and lap portion 212 of seatbelt 202. Thus, adjuster 200 may be sealed around shoulder portion 210 and lap portion 212 of seatbelt 202. However, in still further exemplary embodiments, while adjuster 200 may be securely sealed around seatbelt 202, adjuster 200 may be moved in a substantially lateral manner from seatbelt anchor 214 along the lap of a wearer.

In exemplary FIG. 5a, after adjuster 200 is securely fastened around seatbelt 202, adjuster 200 may be moved to a desired position or location. For example, after seatbelt 202 is secured to anchor 214 and adjuster 200 is folded and coupled to seatbelt 202, movement of both shoulder portion 210 and lap portion 212 of seatbelt 202 may be the same or similar as any movements without the presence of adjuster 200. Further, any desired adjustments to lap portion 212 or shoulder portion 210 may be made at this time. For example, lap portion 212 of seatbelt 202 may be moved to any desired or comfortable location, such as a position snug or tight across the lap of the wearer of seatbelt 202. Further, adjuster 200 may be moved freely to any location that is desired, for example to a substantially central portion of the lap of a seatbelt wearer. When adjuster 200 is moved from a location proximate seatbelt anchor 214 to a location further away from seatbelt anchor 214, shoulder portion 210 of seatbelt 202 may be substantially adjusted. For example, as adjuster 200 is moved away from seatbelt anchor 214, shoulder portion 210 of seatbelt 202 may be moved from a position substantially across the chest of the seatbelt wearer to a position substantially down the center of the chest of the seatbelt wearer. Movement of adjuster 200 may be facilitated by moving it along a substantially parallel path that is made by shoulder portion 210 and lap portion 212 of seatbelt 202. In some exemplary embodiments, an additional length of a substantially parallel path may be achieved by having the user pull on shoulder portion 210 and moving adjuster 200 over shoulder portion 210 and lap portion 212 to a desired location.

In a further exemplary embodiment, and referring now to FIG. 5b, adjuster 200 may be moved to a desired location along a path made by shoulder portion 212 and lap portion 210 of seatbelt 202. Any additional slack that may remain in shoulder portion 212 may be released at this time, for example by the user, as adjust 200 may be moved freely until tension supplied by a user of adjuster 200 on shoulder portion 210 and lap portion 212 of seatbelt 202 is released. Adjuster 200 may then be substantially fixed or locked in the desired location. As discussed previously, both shoulder portion 210 and lap portion 212 may be securely held inside adjuster 200. Additionally, after adjuster 200 is moved to a desired location, for example that shown in FIG. 5b, the forces acting upon seatbelt 202 may cause adjuster 200 to be fixed in a position. For example, due to the known functionality of seatbelts, there will be a substantially upwards force, such as f1 in exemplary FIG. 5b, exerted on shoulder portion 210 as that portion of the seatbelt is pulled back by a tensioner (not pictured). Similarly, lap portion 212 has a substantially downwards and lateral force, such as f2 in exemplary FIG. 5b, exerted on it by way of seatbelt 202 being buckled into anchor 214. Therefore there are known opposing forces f1 and f2 between shoulder portion 210 and lap portion 212, at least a portion of which are used to hold the wearer of seatbelt 202 in place and provide for proper functionality of seatbelt 202. However, when adjuster 200 is moved to a desired location, the opposing forces f1 and f2 of shoulder portion 210 and lap portion 212 work to hold adjuster 200 firmly in place. This may ensure that adjuster 200 does not move laterally or vertically after it is moved to a desired location and further may allow for the position of shoulder portion 210 to be maintained, for example away from the neck of a user and down the center of the chest of a user, without affecting the effectiveness of seatbelt 202. Having 110 and 112 shorter in length than 114 may ensure proper functionality of seatbelt 202. When released the interior of 200 tightens and pressure is asserted on 110 and 112 against 114. As 110 and 112 are shorter than 114 this causes the outer edge of 210 to twist slightly as it comes out of 200. This slight twist is enough to keep 202 resting flat all along the full length of 202 as noted in FIG. 5b. Additionally, as soon as seatbelt 202 is unbuckled or otherwise released from anchor 214, the opposing f1 and f2 and tensions between shoulder portion 210 and lap portion 212 may be negated and adjuster 200 can again slide freely along seatbelt 202.

Adjuster 200 may therefore provide for the adjustment of a restraining device, such as a seatbelt, in such a manner that the effectiveness of the restraining device is not compromised and the comfort of the user is improved. For the example using seatbelts, irritation can occur when they are being used properly, such as in the neck, chest and torso area of the wearer. Thus, despite their use being mandated in many jurisdictions, individuals often choose not to wear or to improperly wear their seatbelts. Adjuster 200 can alleviate discomfort in the neck, chest and torso area of a wearer by positioning or adjusting the seatbelt to a comfortable position while retaining the seatbelt's effectiveness.

In still further exemplary embodiments, adjuster 200 may be such that after it is coupled to a restraining device, such as a seatbelt, it may remain coupled to the seatbelt until its presence or use is no longer desired. For example, when seatbelt 202 is unbuckled, adjuster 200 may maintain its position at an end portion of seatbelt 202 proximate to a latch or seatbelt anchor 214. Further, when seatbelt 202 is buckled using a latch and a buckle to form anchor 214, adjuster 200 may remain in a position proximate to a latch and a buckle, and thus will not affect the traditional positioning of seatbelt 202 on the wearer. However, if adjustment to seatbelt 202 is desired at that time, or at any time after adjuster 200 is coupled to seatbelt 202 and seatbelt 202 is buckled, the wearer may choose to utilize adjuster 200 as desired. Thus, adjuster 200 may be utilized without needing to be removed from a vehicle regardless of whether or not the person using seatbelt 202 desires to adjust the positioning of the seatbelt 202; although, due to its design, adjuster 200 may be simply removed at any desired time. Similarly, due to the slidable coupling and range of motion of adjuster 200 on seatbelt 202, people of different shapes and sizes may use adjuster 200 to position seatbelt 202 in a desired or comfortable position without adversely impacting the effectiveness of seatbelt 202.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

Reference is made to attached Quasi-Static report by MGA Research Corporation reported on Oct. 14, 2011 as support for statements referencing 'effectiveness of a restraining device is maintained' . . . and . . . 'for proper functionality of seatbelt 202' . . . and . . . 'without affecting the effectiveness of seatbelt 202' . . . and . . . 'in such a manner that the effectiveness of the restraining device is not compromised' . . . and . . . 'while retaining the seatbelt's effectiveness.' . . . and . . . 'without adversely impacting the effectiveness of seatbelt 202' . . . .

What is claimed is:

1. An apparatus for adjusting a restraint, comprising:
a body foldable formed with a first segment, a second segment and a third segment;
a first anchor and a second anchor disposed on an interior portion of the first segment; a third anchor disposed on an interior portion of the second segment;
a backing material having a plurality of ends, portions of said backing material disposed on exterior portions of the first segment, the second segment and the third segment, wherein one end of the backing material is disposed on the third segment;
wherein said backing material has an uncoupled end that is located on an opposite side from the portion of the backing material that is disposed on the the third segment; and
a coupling mechanism disposed on portions of the backing material;
wherein the coupling mechanism is a hook and loop fastener;
wherein one portion of the hook and loop fastener is located on an exterior portion of the backing material that is disposed on the third segment, and another portion of the hook and loop fastener is located on an interior portion of the uncoupled end of the backing material, such that the respective portions of the hook and loop fastener are engaged together, so as to adjust the restraint.

2. The apparatus of claim 1, wherein the third anchor is disposed in a position between the first anchor and the second anchor when the body is in a closed position.

3. The apparatus of claim 1, wherein the body is formed of a pliable, resilient material.

4. The apparatus of claim 3, wherein the pliable, resilient material is acid-free foam layered over polyurethane.

5. The apparatus of claim 1, wherein the anchors are formed of a substantially rigid material.

6. The apparatus of claim 1, wherein the first anchor, the second anchor and the third anchor are sewn into position.

7. The apparatus of claim 1, wherein the first anchor, the second anchor and the third anchor are formed of a substantially rigid material.

8. The apparatus of claim 1, wherein the first anchor and the second anchor are about 0.5" by about 1" and the third anchor is about 0.5 by about 2".

9. The apparatus of claim 1, wherein the entire body encompassing the first, second and third anchors are about 8" by about 1.75".

* * * * *